United States Patent
Mitani et al.

(10) Patent No.: US 8,988,840 B2
(45) Date of Patent: Mar. 24, 2015

(54) OVERCHARGE PREVENTION CIRCUIT AND SEMICONDUCTOR DEVICE

(75) Inventors: Makoto Mitani, Chiba (JP); Kotaro Watanabe, Chiba (JP)

(73) Assignee: Seiko Instruments Inc., Chiba (JP)

( * ) Notice: Subject to any disclaimer, the term of this patent is extended or adjusted under 35 U.S.C. 154(b) by 0 days.

(21) Appl. No.: 13/612,130

(22) Filed: Sep. 12, 2012

(65) Prior Publication Data
US 2013/0077203 A1 Mar. 28, 2013

(30) Foreign Application Priority Data
Sep. 28, 2011 (JP) ................. 2011-213020

(51) Int. Cl.
*H02H 3/20* (2006.01)
*H02H 9/04* (2006.01)
*H02J 7/00* (2006.01)

(52) U.S. Cl.
CPC ............. *H02J 7/00* (2013.01); *Y02E 10/566* (2013.01); *H02J 2007/0037* (2013.01)
USPC .................................. 361/91.1; 361/91.5

(58) Field of Classification Search
CPC ......... H02H 3/202; H02H 7/18; H02H 9/041; H02H 9/043; H02J 7/0031; H02J 2007/0037
USPC .................................................. 361/91.1, 91.5
See application file for complete search history.

(56) References Cited

U.S. PATENT DOCUMENTS

| 5,714,869 | A | * | 2/1998 | Tamechika et al. | 320/101 |
| 6,172,482 | B1 | * | 1/2001 | Eguchi | 320/134 |
| 2008/0266739 | A1 | * | 10/2008 | Migliavacca | 361/91.1 |
| 2009/0091872 | A1 | * | 4/2009 | Ueda | 361/91.1 |

FOREIGN PATENT DOCUMENTS

JP 2002-010518 1/2002

* cited by examiner

*Primary Examiner* — Thienvu Tran
*Assistant Examiner* — Christopher Clark
(74) *Attorney, Agent, or Firm* — Brinks Gilson & Lione

(57) ABSTRACT

Provided is an overcharge prevention circuit for clamping a voltage value of an electric power generation unit in an overcharged state to a constant value, in which the number of elements is small and which does not consume electric power unnecessarily. The overcharge prevention circuit includes: a backflow prevention diode; a clamping transistor having a gate connected to a cathode of the backflow prevention diode, a source connected to an anode thereof, and a drain connected to an overcharge prevention switch. Upon detection of overcharge, a current is discharged via the clamping transistor and the overcharge prevention switch, thereby clamping a potential of the electric power generation unit to around a voltage of an electricity storage unit.

2 Claims, 6 Drawing Sheets

US 8,988,840 B2

OVERCHARGE PREVENTION CIRCUIT AND SEMICONDUCTOR DEVICE

RELATED APPLICATIONS

This application claims priority under 35 U.S.C. §119 to Japanese Patent Application No. 2011-213020 filed on Sep. 28, 2011, the entire content of which is hereby incorporated by reference.

BACKGROUND OF THE INVENTION

1. Field of the Invention

The present invention relates to a semiconductor device for charging electric power generated by electric power generation means into electricity storage means, and driving a drive circuit by the generated electric power or the stored electric power, and more specifically, to an overcharge prevention circuit for preventing overcharge into electricity storage means.

2. Description of the Related Art

FIG. 3 is a circuit diagram illustrating a semiconductor device including a conventional overcharge prevention circuit. The semiconductor device including the conventional overcharge prevention circuit includes a solar battery 31 as electric power generation means, a secondary battery 32 as electricity storage means, a diode 33 as a backflow prevention circuit, an overcharge detection circuit 34, and an NMOS transistor 35 as an overcharge prevention switch.

A negative terminal of the solar battery 31 is connected to a low-potential side power source VSS. A positive terminal of the solar battery 31 is connected to an electric power generation source VSOL. A negative terminal of the secondary battery 32 is connected to the low-potential side power source VSS. A positive terminal of the secondary battery 32 is connected to an electricity storage power source VBAT. The diode 33 has an anode terminal connected to the electric power generation source VSOL and a cathode terminal connected to the electricity storage power source VBAT. The overcharge detection circuit 34 is driven between the electricity storage power source VBAT and the low-potential side power source VSS. An output node VDET outputs a High (VBAT) level when VBAT is a predetermined voltage VLIM or more, and outputs a Low (VSS) level when VBAT is less than the predetermined voltage VLIM. The NMOS transistor 35 has a drain terminal connected to the electric power generation source VSOL, a source terminal and a back gate terminal connected to the low-potential side power source VSS, and a gate terminal connected to an output terminal of the overcharge detection circuit 34.

Next, an operation of the semiconductor device including the conventional overcharge prevention circuit is described. FIG. 4 is an operational explanatory diagram of the semiconductor device including the conventional overcharge prevention circuit. A forward voltage of the diode 33 is represented by VF.

In a period of t0 to t1, the solar battery 31 does not generate electric power or the amount of generated electric power of the solar battery 31 is small, and the relationship of VSOL<VBAT+VF is established. In this case, the diode 33 is biased in the reverse direction, and a backflow current does not flow from VBAT to VSOL (non-charged state).

In a period of t1 to t2, the amount of generated electric power of the solar battery 31 is large so that a potential of VSOL increases sufficiently, and the relationship of VSOL>VBAT+VF is established. In this case, the diode 33 is biased in the forward direction, and the charge from VSOL to VBAT is performed (charged state).

In a period after t2, VBAT has exceeded the predetermined voltage VLIM, and the output VDET of the overcharge detection circuit 34 becomes the High level (VBAT), and hence the NMOS transistor 35 is turned ON (overcharged state). In this case, a generated current of the solar battery 31 is discharged to VSS via the NMOS transistor 35, and hence a potential of VBAT becomes substantially equal to that of VSS.

In this state, VBAT≈VSS is established regardless of the presence or absence of the generated electric power of the solar battery 31. Accordingly, there has been a problem in that the generated electric power of the solar battery cannot be detected and therefore brightness determination cannot be performed.

Japanese Patent Application Laid-open No. 2002-10518 is known as the invention which has been made in view of the above-mentioned problem. FIG. 5 illustrates a schematic diagram thereof.

A semiconductor device including a conventional overcharge prevention circuit illustrated in FIG. 5 includes a solar battery 51 as electric power generation means, a secondary battery 52 as electricity storage means, a diode 53 as a backflow prevention circuit, an overcharge detection circuit 54, an NMOS transistor 55 as an overcharge prevention switch, a reference voltage generation circuit 56, and a comparator circuit 57. A negative terminal of the solar battery 51 is connected to a low-potential side power source VSS. A positive terminal of the solar battery 51 is connected to an electric power generation source VSOL. A negative terminal of the secondary battery 52 is connected to the low-potential side power source VSS. A positive terminal of the secondary battery 52 is connected to an electricity storage power source VBAT.

The diode 53 has an anode terminal connected to the electric power generation source VSOL and a cathode terminal connected to the electricity storage power source VBAT. The overcharge detection circuit 54 is driven between the electricity storage power source VBAT and the low-potential side power source VSS. An output node VDET outputs a High (VBAT) level when VBAT is a predetermined voltage VLIM or more, and outputs a Low (VSS) level when VBAT is less than the predetermined voltage VLIM. The NMOS transistor 55 has a drain terminal connected to the electric power generation source VSOL, a source terminal and a back gate terminal connected to the low-potential side power source VSS, and a gate terminal connected to an output node VGN of the comparator circuit 57. The reference voltage generation circuit 56 is driven between the electricity storage power source VBAT and the low-potential side power source VSS, and outputs a constant voltage VREF. The comparator circuit 57 is driven between the electricity storage power source VBAT and the low-potential side power source VSS. The comparator circuit 57 has a positive input terminal connected to the electric power generation source VSOL and a negative input terminal connected to the output node VREF of the reference voltage generation circuit 56. The output node VGN of the comparator circuit 57 outputs the High (VBAT) level in the case of VSOL>VREF, and outputs the Low (VSS) level in the case of VSOL<VREF. The comparator circuit 57 has an enable terminal connected to the output VDET of the overcharge detection circuit 54. The comparator circuit 57 is in an operating state when VDET is High and a non-operating state when VDET is Low.

Next, the operation of the semiconductor device including the conventional overcharge prevention circuit illustrated in FIG. 5 is described.

FIG. 6 is an operational explanatory diagram of the semiconductor device including the conventional overcharge prevention circuit. A forward voltage of the diode 53 is represented by VF.

The operation in a non-charged state corresponding to a period of t0 to t1 and a charged state corresponding to a period of t1 to t2 is the same as in FIG. 4.

In a period after t2, VBAT has exceeded the predetermined voltage VLIM, and the output VDET of the overcharge detection circuit 54 becomes the High level (VBAT), and hence the comparator circuit 57 becomes the operating state (overcharged state). Due to a negative feedback operation of the comparator circuit 57 and the NMOS transistor 55, a potential of VSOL becomes equal to a potential of VREF.

In this case, the solar battery 51 can output the potential in the range from the potential of VSS to the potential of VREF in accordance with the amount of generated electric power, and hence brightness determination can also be performed easily.

However, in the semiconductor device including the overcharge prevention circuit illustrated in FIG. 5, as compared to the semiconductor device including the overcharge prevention circuit illustrated in FIG. 3, the reference voltage generation circuit 56 and the comparator circuit 57 are additionally needed in order to add a clamp function. Therefore, there is a problem in that the number of elements constituting the circuit increases, and the chip area increases.

Further, the reference voltage generation circuit 56 and the comparator circuit 57 are driven between the electricity storage power source VBAT and the low-potential side power source VSS. Therefore, there is a problem in that, even if electric power is charged in the electricity storage power source VBAT, the electric power is consumed by the reference voltage generation circuit 56 and the comparator circuit 57.

SUMMARY OF THE INVENTION

The present invention has been made in view of the above-mentioned problems, and provides a semiconductor device including an overcharge prevention circuit for clamping a voltage value of electric power generation means in an overcharged state to a constant value, which has a small number of elements and does not consume electric power unnecessarily.

In order to solve the conventional problems, a semiconductor device including an overcharge prevention circuit according to the present invention has the following configuration.

The present invention provides an overcharge prevention circuit, including: an overcharge detection circuit connected to a positive terminal and a negative terminal of electricity storage means, for detecting a voltage of the electricity storage means; an overcharge prevention transistor including: a gate terminal connected to an output terminal of the overcharge detection circuit; and a source terminal and a back gate terminal connected to a ground terminal; and a clamping transistor including: a gate terminal connected to the positive terminal of the electricity storage means; a drain terminal connected to a drain terminal of the overcharge prevention transistor; and a source terminal and a back gate terminal connected to a positive terminal of electric power generation means. In addition, the present invention provides a semiconductor device including the overcharge prevention circuit.

The present invention can provide the overcharge prevention circuit having a clamp function with a small number of elements and without consuming unnecessary electric power, and the semiconductor device including the overcharge prevention circuit.

DETAILED DESCRIPTION OF THE PREFERRED EMBODIMENTS

Figure 1:
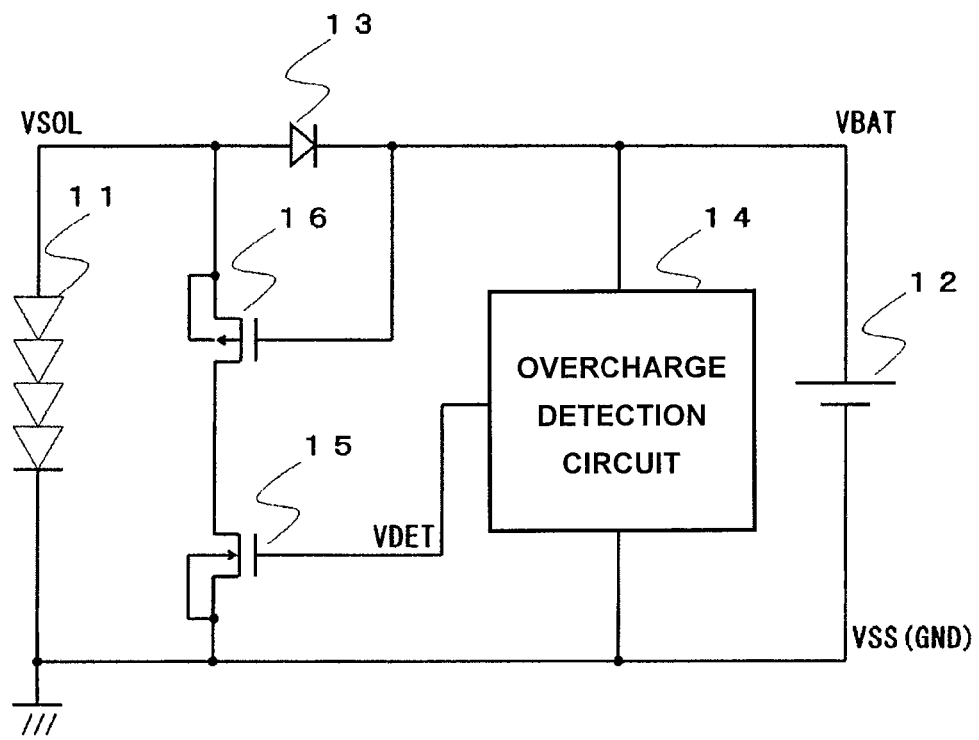
FIG. 1 is a diagram illustrating a semiconductor device including an overcharge prevention circuit according to an embodiment of the present invention.

FIG. 1 is a circuit diagram illustrating a semiconductor device including an overcharge prevention circuit according to an embodiment of the present invention.

The semiconductor device including the overcharge prevention circuit according to this embodiment includes a solar battery 11 as electric power generation means, a secondary battery 12 as electricity storage means, a diode 13 as a backflow prevention circuit, an overcharge detection circuit 14, an NMOS transistor 15 as an overcharge prevention switch, and a PMOS transistor 16 as a clamping transistor.

The solar battery 11 has a negative terminal connected to a low-potential side power source VSS and a positive terminal connected to an electric power generation source VSOL. The secondary battery 12 has a negative terminal connected to the low-potential side power source VSS and a positive terminal connected to an electricity storage power source VBAT. The diode 13 has an anode terminal connected to the electric power generation source VSOL and a cathode terminal connected to the electricity storage power source VBAT. The overcharge detection circuit 14 has an input terminal connected to the electricity storage power source VBAT and the low-potential side power source VSS and an output terminal connected to a gate terminal of the NMOS transistor 15. The NMOS transistor 15 has a source terminal and a back gate terminal connected to the low-potential side power source VSS, and the gate terminal connected to the output terminal of the overcharge detection circuit 14. The PMOS transistor 16 has a gate terminal connected to the electricity storage power source VBAT and the cathode terminal of the diode 13, a source terminal and a back gate terminal connected to the electric power generation source VSOL and the anode terminal of the diode 13, and a drain terminal connected to a drain terminal of the NMOS transistor 15.

The overcharge detection circuit 14 is driven between the electricity storage power source VBAT and the low-potential side power source VSS. An output node VDET outputs a High (VBAT) level when VBAT is a predetermined voltage VLIM or more, and outputs a Low (VSS) level when VBAT is less than the predetermined voltage VLIM.

Figure 2:
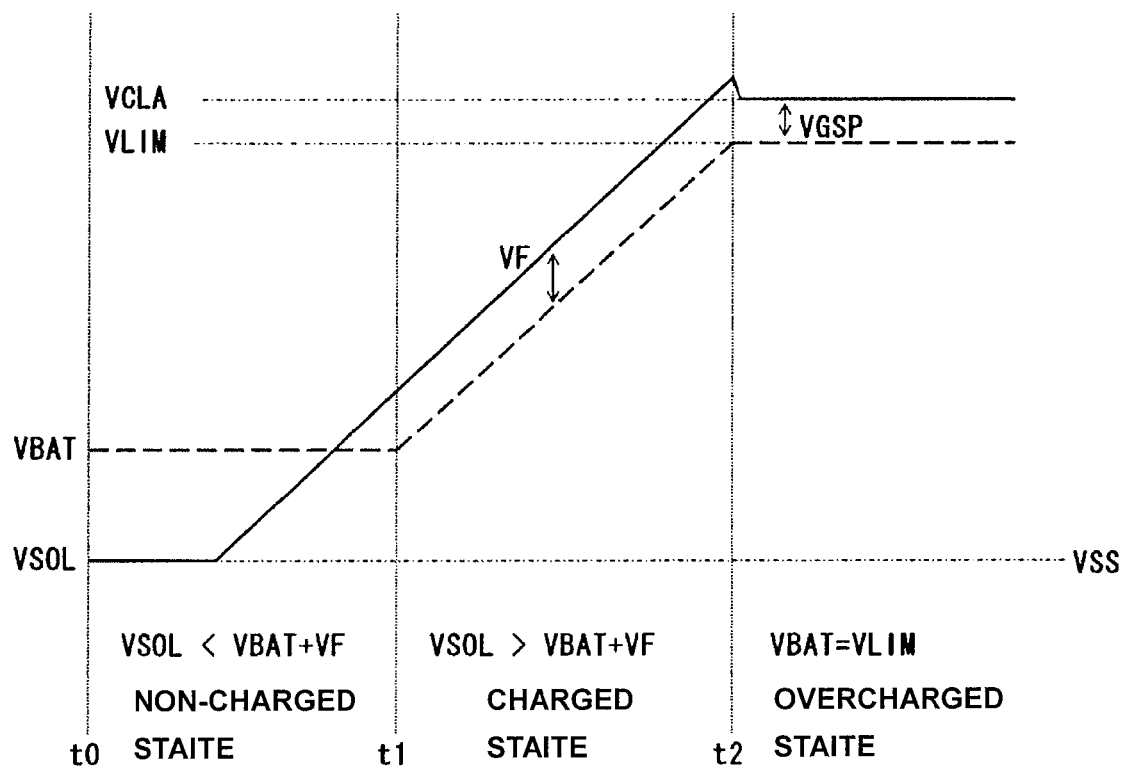
FIG. 2 is a graph showing an operation of the semiconductor device including the overcharge prevention circuit according to the embodiment of the present invention.
Figure 3:
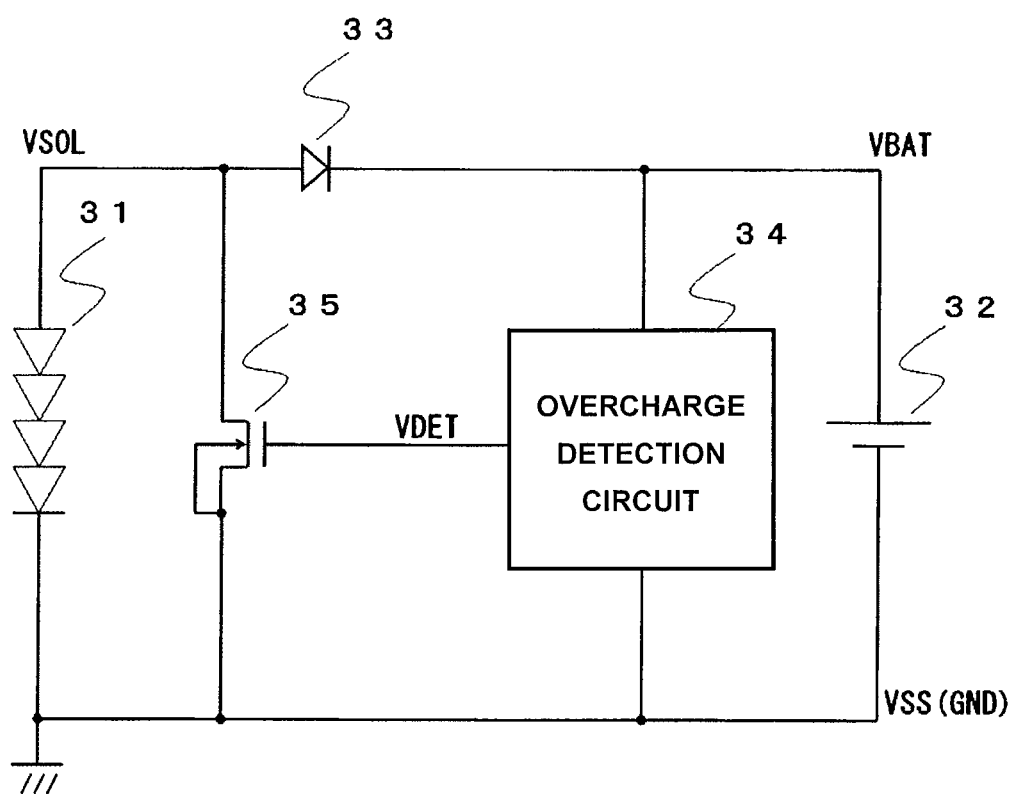
FIG. 3 is a diagram illustrating a semiconductor device including a conventional overcharge prevention circuit.
Figure 4:
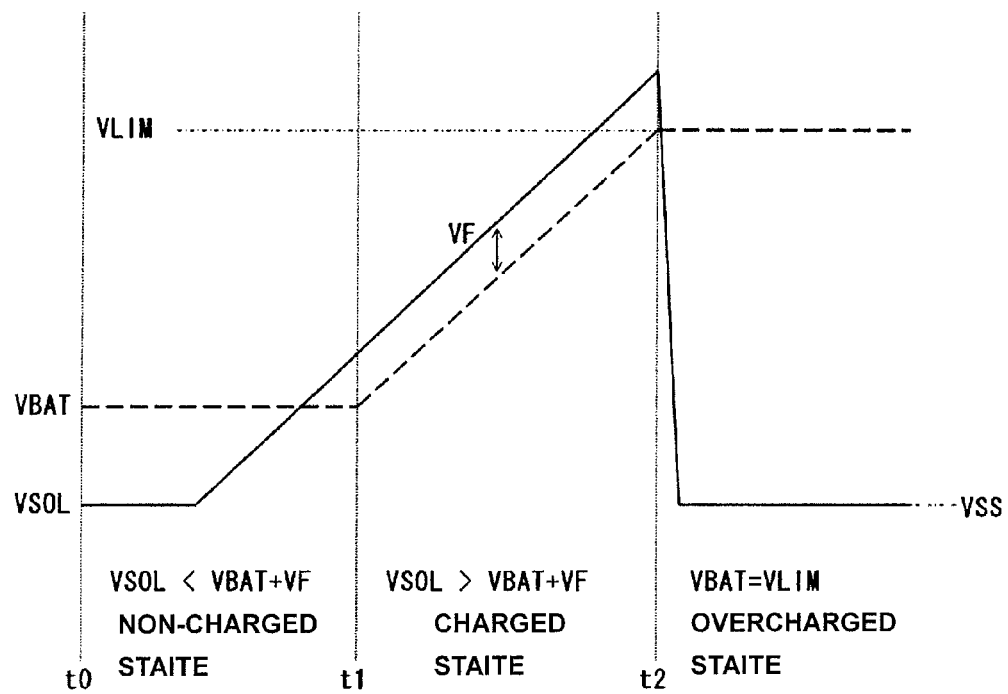
FIG. 4 is graph showing an operation of the semiconductor device including the conventional overcharge prevention circuit.
Figure 5:
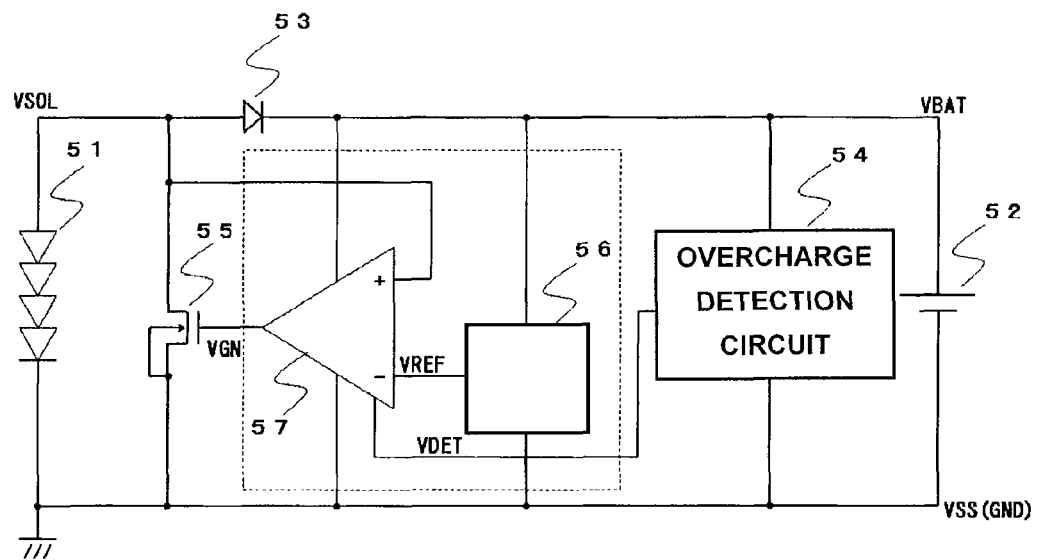
FIG. 5 is a diagram illustrating another example of the semiconductor device including the conventional overcharge prevention circuit.
Figure 6:
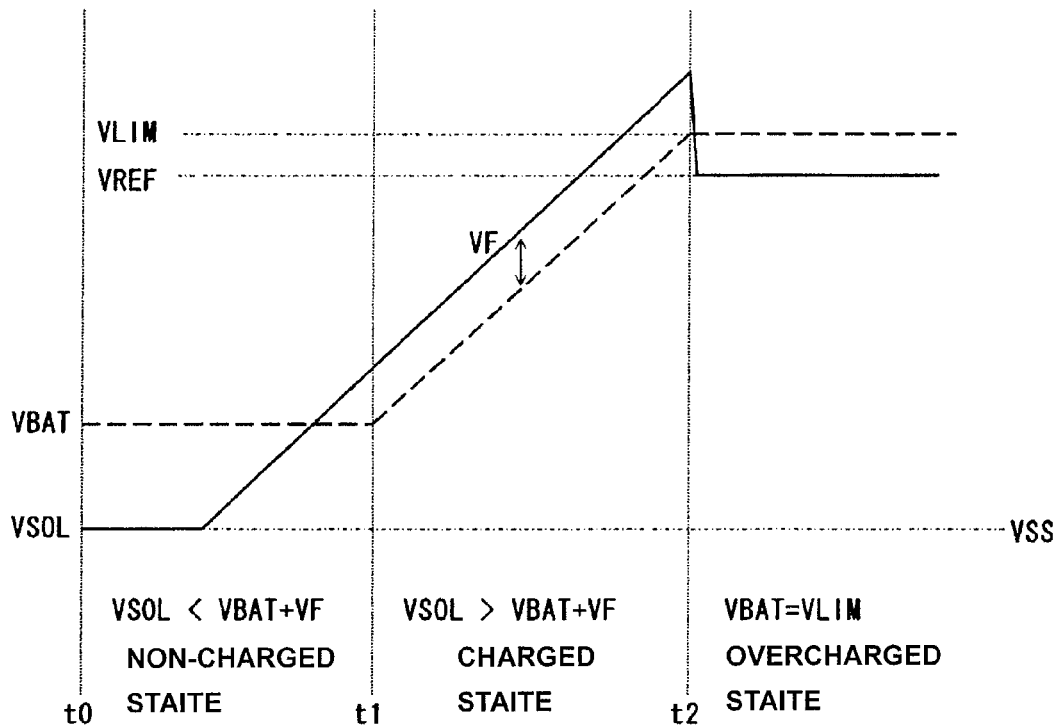
FIG. 6 is a graph showing an operation of another example of the semiconductor device including the conventional overcharge prevention circuit.

Next, an operation of the semiconductor device including the overcharge prevention circuit according to this embodiment is described. FIG. 2 is an operational explanatory diagram of the semiconductor device including the overcharge prevention circuit according to this embodiment. A forward voltage of the diode 13 is represented by VF.

In a period of t0 to t1, the solar battery 11 does not generate electric power or the amount of generated electric power of the solar battery 11 is small, and the relationship of VSOL<VBAT+VF is established. In this case, the diode 13 is biased in the reverse direction, and a backflow current does not flow from VBAT to VSOL (non-charged state).

In a period of t1 to t2, the amount of generated electric power of the solar battery 11 is large so that a potential of VSOL increases sufficiently, and the relationship of VSOL>VBAT+VF is established. In this case, the diode 13 is biased in the forward direction, and the charge from VSOL to VBAT is performed (charged state).

In a period after t2, VBAT has exceeded the predetermined voltage VLIM, and the output VDET of the overcharge detection circuit 14 becomes the High level (VBAT), and hence the NMOS transistor 15 is turned ON (overcharged state). In this case, a generated current of the solar battery 11 is discharged to VSS via the PMOS transistor 16 and the NMOS transistor 15.

However, the gate terminal of the PMOS transistor 16 is applied with VBAT, and hence a potential of VSOL corresponding to the source terminal of the PMOS transistor 16 is clamped to a voltage expressed by VCLA=VBAT+VGSP, where VGSP represents a potential difference between the gate and the source of the PMOS transistor 16.

In this case, the solar battery 11 can output the potential in the range from the potential of VSS to the potential of VCLA in accordance with the amount of generated electric power, and hence brightness determination can also be performed easily. In this case, it is necessary to set VGSP so as to satisfy the relationship of VGSP<VF.

As described above, according to the overcharge prevention circuit of this embodiment, a single clamping transistor is merely added, and hence it is possible to realize clamping of a generated voltage in the overcharged state while suppressing the increase in chip area at minimum and without increasing unnecessary current consumption.

Note that, in the overcharge prevention circuit according to this embodiment, when a threshold voltage of the PMOS transistor 16 as the clamping transistor is set lower than that of a normal transistor, the relationship of VGSP<VF can be satisfied more reliably in the overcharged state. Therefore, a semiconductor device including a safer overcharge prevention circuit can be provided.

The semiconductor device including the overcharge prevention circuit according to this embodiment described above uses a solar battery as the electric power generation means, a secondary battery as the electricity storage means, and a diode as the backflow prevention circuit, but the configuration is not limited thereto.

In the above description, the ground voltage is the lowest voltage VSS, but the case where the ground voltage is set to a highest voltage (such as VDD) and the electric power generation source VSOL and the electricity storage power source VBAT output a negative voltage is also included in the scope of the present invention.

What is claimed is:

1. An overcharge prevention circuit for a semiconductor device whose power source is an electrical storage device charged by an electric power generation device, for preventing overcharge of the electrical storage device, the overcharge prevention circuit comprising:
   an overcharge detection circuit connected to a positive terminal and a negative terminal of the electrical storage device, for detecting a voltage of the electrical storage device;
   an overcharge prevention transistor including:
      a gate terminal connected to an output terminal of the overcharge detection circuit; and
      a source terminal and a back gate terminal connected to a ground terminal; and
   a clamping transistor including:
      a gate terminal connected to a positive terminal of the electrical power generation device via a back flow prevention circuit located between the gate terminal and a source terminal thereof;
      a drain terminal connected to a drain terminal of the overcharge prevention transistor; and
      the source terminal and a back gate terminal electrically connected to the positive terminal of the electric power generation device, such that the drain terminal of the overcharge prevention transistor is electrically connected to the positive terminal of the electric power generation device through the clamping transistor, and the overcharge prevention transistor and the clamping transistor are connected in series between the positive terminal and a negative terminal of the electric power generation device, such that an overcharge voltage of the electric power generation device is restricted to a voltage of the electrical storage device plus a gate-source voltage of the clamping transistor.

2. A semiconductor device, comprising:
electric power generation device;
electrical storage device; and
the overcharge prevention circuit according to claim 1, wherein the backflow prevention circuit prevents backflow from the electrical storage device to the electric power generation device.

* * * * *